United States Patent [19]

Casteel

[11] Patent Number: 4,611,968

[45] Date of Patent: Sep. 16, 1986

[54] LIFTING AND TOWING APPARATUS FOR LARGE VEHICLES

[75] Inventor: Frankie E. Casteel, Soddy Daisy, Tenn.

[73] Assignee: Dover Corporation, Chattanooga, Tenn.

[21] Appl. No.: 685,463

[22] Filed: Dec. 24, 1984

[51] Int. Cl.⁴ .............................................. B60P 3/12
[52] U.S. Cl. .................................. 414/563; 414/542; 280/402
[58] Field of Search ...................... 414/541, 542, 563; 212/255, 264, 266–269; 280/402

[56] References Cited

U.S. PATENT DOCUMENTS

| | | | |
|---|---|---|---|
| 4,216,941 | 8/1980 | Little | 414/563 X |
| 4,451,193 | 5/1984 | Cannon et al. | 414/563 |
| 4,473,334 | 9/1984 | Brown | 414/563 |
| 4,534,579 | 8/1985 | Shackelford | 414/563 X |

Primary Examiner—Leslie J. Paperner
Assistant Examiner—Ken Muncy
Attorney, Agent, or Firm—Alan Ruderman

[57] ABSTRACT

Apparatus adapted to be mounted on the bed of a towing vehicle for lifting and towing disabled vehicles, particularly large vehicles. The apparatus includes an extendible boom disposed for positioning beneath the disabled vehicle and retracted for moving the disabled vehicle close to the rear of the towing vehicle. The boom is pivotable about a substantially horizontal axis on an elevator from a vertically disposed storage position to its operative position, the elevator being slidably mounted in slideways for vertical movement between the storage position and the operative positions. The elevator is supported by an extendible beam which is vertically driven for raising and lowering the elevator and which is extendible for varying the angular inclination of the elevator which may pivot relative to the slideways.

19 Claims, 12 Drawing Figures

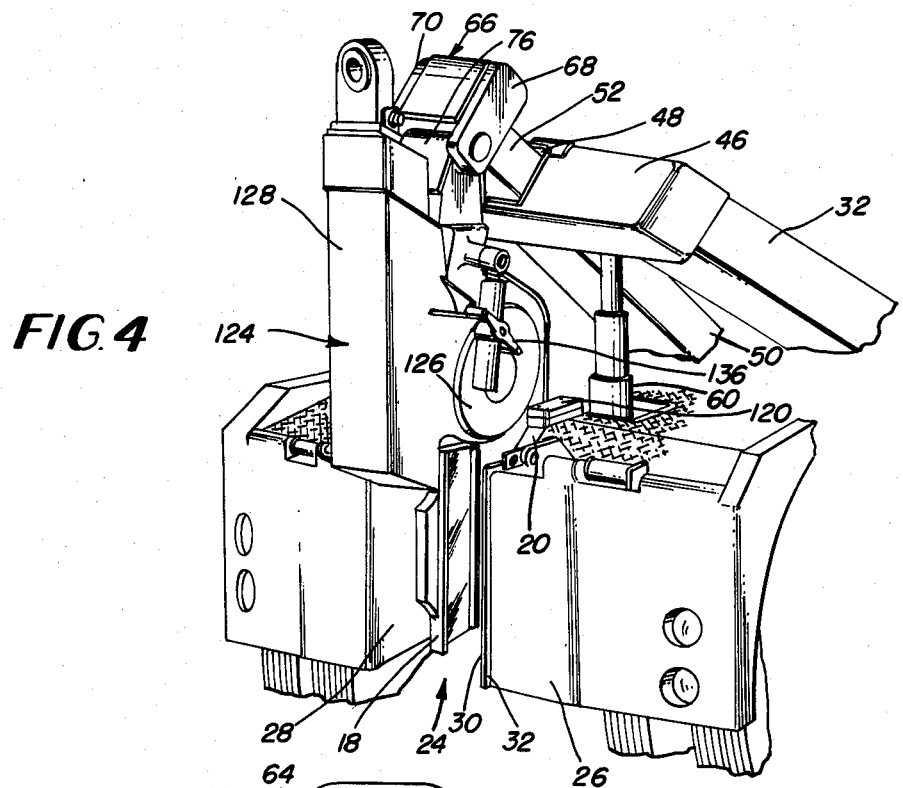
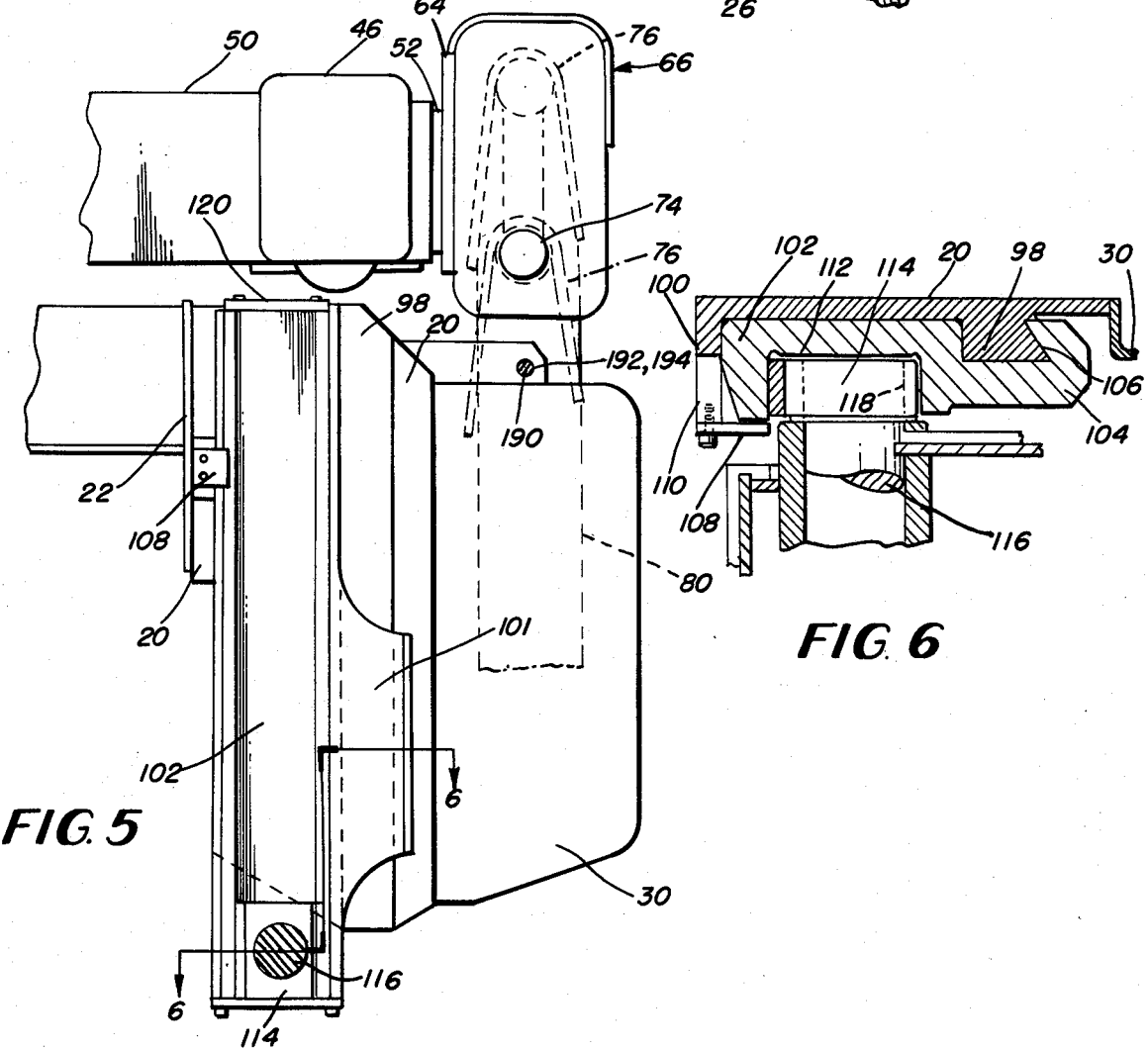
FIG. 4
FIG. 5
FIG. 6

LIFTING AND TOWING APPARATUS FOR LARGE VEHICLES

BACKGROUND OF THE INVENTION

This invention relates to vehicle lifting and towing apparatus and more particularly to apparatus of this type adapted to lift and tow large vehicles such as trucks, buses and the like, the apparatus comprising universally adaptable structure which may be compactly disposed on the rear of a towing vehicle with small rearward extension when stowed and permitting a towed vehicle to be drawn up close to the towing vehicle for proper weight distribution.

Although apparatus for lifting and towing automobiles is well known in the prior art most of this art is not adapted to the lifting and towing of large, bulky and heavy vehicles. Historically, the most common manner of lifting or hoisting and towing disabled vehicles is by attaching a hook on the end of a cable to the bumper or undercarriage of the vehicle and thereafter retracting the cable until it is taut, and then raising the boom over which the cable is carried. This is still the preferred manner utilized for recovery operations, e.g., winching a disabled vehicle out of a ditch or the like. Recently wheel lift apparatus have been developed for lifting and towing vehicles by the wheels. In these devices a pair of wheel supporting frames or troughs are disposed at the end of a boom which is raised to lift the wheels and thus the vehicle. Examples of the various apparatus of this type are disclosed in Nelson U.S. Pat. No. 3,434,608; Peck U.S. Pat. No. 3,951,280; Pigeon U.S. Pat. No. 3,924,763; Petersen U.S. Pat. No. 4,384,817; Cannon, et al U.S. Pat. No. 4,451,193; and Brown U.S. Pat. No. 4,473,334; and in German Auslegeschrift No. 2008523 and German Offenlegungsschrift No. 2821436. In some of these disclosures the apparatus is used in conjunction with wrecker apparatus so that the recovery features are not sacrificed. Other designs, however, are such that they cannot be mounted together with a wrecker on the bed of the towing vehicle and still be capable of having little or no rearward extension when in the stow position.

The known apparatus for lifting and towing large vehicles are merely heftier versions of the automobile lifting and towing apparatus, or are such that the entire disabled vehicle is placed on the bed of the towing vehicle. Thus, they generally either do not have recovery capabilities or the lifting and towing apparatus excessively protrudes beyond the rear of the bed of the vehicle.

The features desirable in lifting and towing apparatus for trucks, buses and other large vehicles (hereinafter cumulatively called "large vehicles") in the stow position include a small above-the-bed extension, a minimal extension beyond the rear of the bed and a significant above-the-ground clearance. Additionally, in the operative position the apparatus should be capable of supporting the towed vehicle closely proximate the rear of the towing vehicle for proper weight distribution and should have variable boom attitude capabilities for loading a vehicle on inclines and the like. Moreover, such apparatus should be flexible enough for use with various vehicles to be towed, but adaptable for use on a multiple of towing vehicles, e.g., vehicles having beds of various distances above the road.

SUMMARY OF THE INVENTION

Consequently, it is a primary object of the present invention to provide apparatus adapted to be mounted on a towing vehicle which is universally adaptable for lifting large vehicles such as trucks, buses and the like.

It is another object of the present invention to provide large vehicle lift and tow apparatus mountable on a towing vehicle, the apparatus having a lifting boom pivotable about a horizontal axis from a vertically disposed storage position to an operative position for supporting a towed vehicle on means carried thereby, the lifting boom being carried by a vertically slidable elevator pivotable about a horizontal axis.

It is a further object of the present invention to provide apparatus for lifting and towing large vehicles, the apparatus being readily mountable on a towing vehicle and including an extendible lifting boom pivotable about a horizontal axis from a vertically disposed storage position to an operative position, an elevator mounted for vertical movement within a slideway, and extendible beam means for raising and lowering the elevator together with the lifting boom.

It is a still further object of the present invention to provide apparatus for lifting and towing large vehicles, the apparatus being readily mountable on a towing vehicle and including an extendible lifting boom pivotable about a horizontal axis from a vertically disposed storage position to an operative position, an elevator mounted for vertical movement within a slideway, extendible beam means for raising and lowering the elevator together with the lifting boom, and wherein the elevator is pivotable about a horizontal axis for varying the angular inclination of the boom.

Accordingly, the present invention provides apparatus adapted to be mounted readily on the bed at the rear of a towing vehicle for lifting and towing disabled vehicles, particularly large vehicles such as trucks and buses. The apparatus includes an extendible boom disposed for positioning beneath the undercarriage of a disabled vehicle and retractable for moving the disabled vehicle closely proximate the towing vehicle and for disposition of the boom into a storage position, the boom being pivotable about a substantially horizontal axis on an elevator from a substantially vertically disposed storage position to an operative position. The elevator is slidably mounted in slideways for vertical movement between the storage position and the operative positions of loading and towing, and the boom further being angularly disposed relative to the elevator in the operative position and substantially aligned vertically with the elevator in the storage position. The elevator is carried by a beam which is vertically driven for raising and lowering the elevator together with the boom between the storage position and the various operative positions, the beam also being extendible for varying the angular inclination of the elevator which may pivot relative to the slideways. Thus, the boom may be manipulated for receiving a disabled vehicle on surfaces of various inclinations and thereafter raised to a substantially horizontal position for towing. The beam preferably is carried by a pair of pivotably mounted members disposed so as to straddle wrecking apparatus which may be mounted on the towing vehicle, whereby the recovery capabilities of the towing vehicle are not sacrificed. The beam carrying members may be mounted in a bucket member so as to be dropped into and secured within a well of the towing vehicle. The slideways within which the elevator is mounted preferably are telescopically slidable members so that the apparatus may be universally adapted for towing vehicles having beds of various amounts above the roadway. The boom may be constructed so that a single small stroke hydraulic cylinder may twice be extended to provide double the extension capabilities of conventional booms.

BRIEF DESCRIPTION OF THE DRAWINGS

The particular features and advantages of the invention as well as other objects will become apparent from the following description taken in connection with the accompanying drawings, in which:

FIG. 4 is a rear perspective view similar to FIG. 2, but with the boom folded and with the elevator raised to illustrate one of the elevator slide rails;

FIG. 5 is an elevational view partly in section looking into the elevator slideway track and rail opposite to that shown in FIG. 4, and with the members being in an unraised position;

FIG. 6 is an enlarged fragmentary cross sectional view taken substantially along line 6—6 of FIG. 5;

DESCRIPTION OF THE PREFERRED EMBODIMENT

Figure 1:
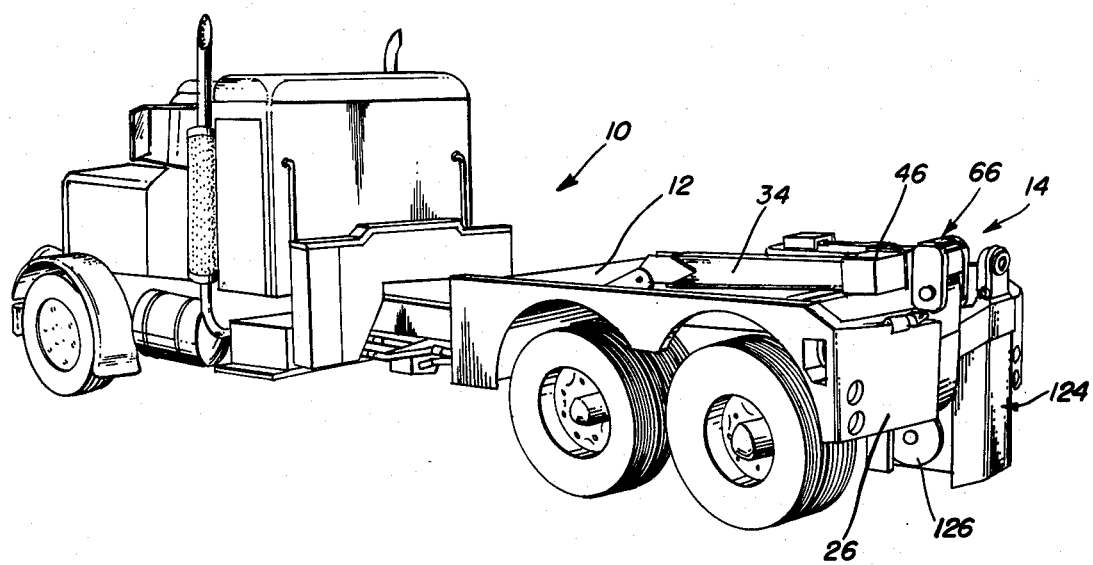
FIG. 1 is a rear perspective view of a towing vehicle having lifting and towing apparatus constructed in accordance with the principles of the present invention, the boom and elevator assemblies of the apparatus being illustrated in the stow position and the beam being illustrated in the position just prior to and subsequent to stow.
Figure 3:
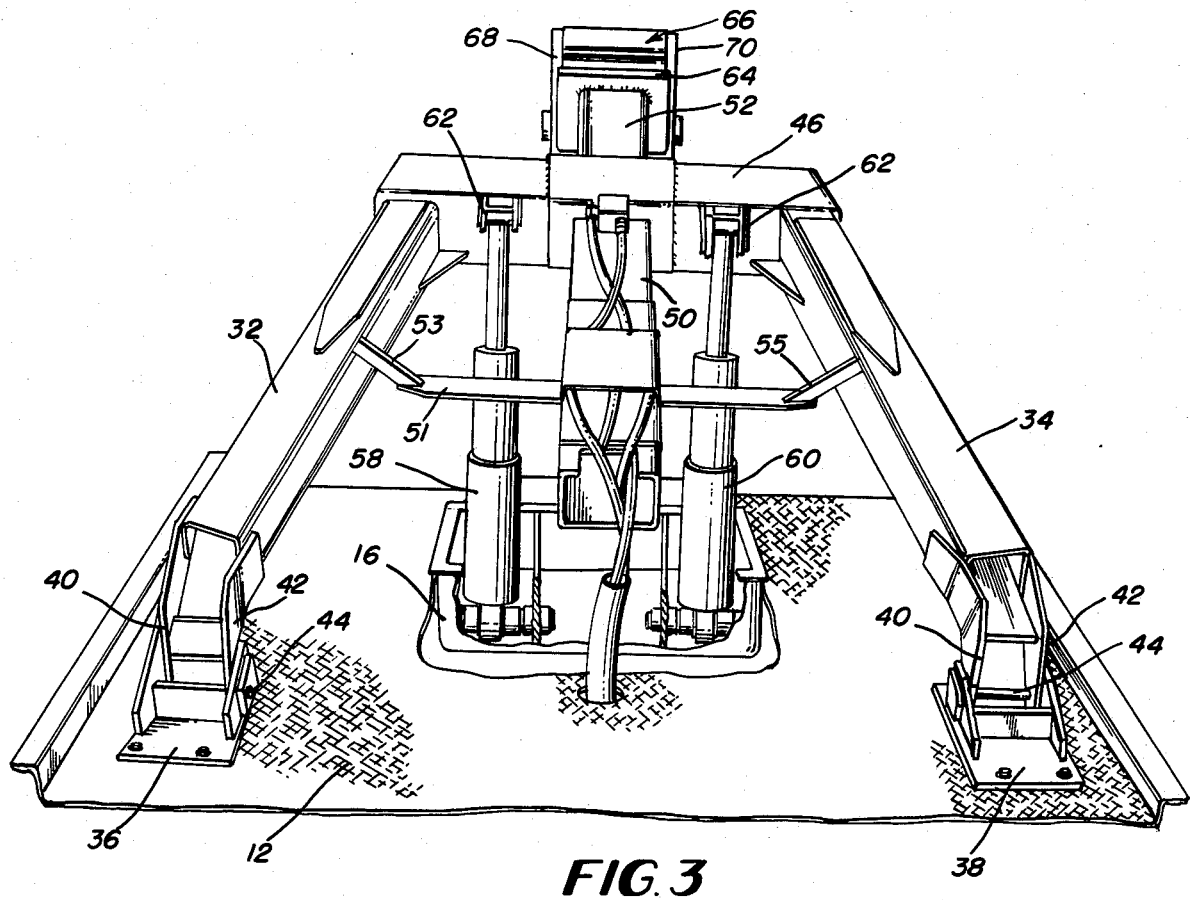
FIG. 3 is a perspective view of a portion of the apparatus looking rearwardly of the bed of the towing vehicle with the extendible beam members in a raised position.
Figure 9:
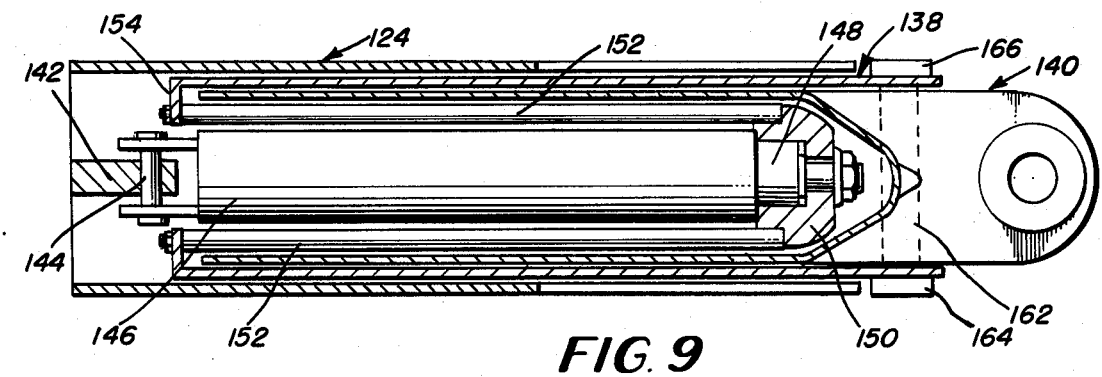
FIG. 9 is a horizontal enlarged cross sectional view taken substantially through the boom along line 9—9 of FIG. 2 illustrating the telescoping sections thereof.

Referring now to the drawings, FIG. 1 illustrates a vehicle 10 in the form of a large truck having a bed 12 at the rear thereof on which lifting and towing apparatus designated generally at 14 is mounted. The apparatus 14, as best illustrated in FIG. 3, includes a bucket 16 adapted to be positioned in a well cut out of the bed 12 of the vehicle 10, the bucket being secured therein by welds or the like to the frame of the vehicle. A pair of spaced apart rails 18, 20 are welded to the rear wall 22 of the bucket as best illustrated in FIGS. 4 and 5, the rails being disposed between an opening 24 cut out of the tail board 26 of the vehicle 10. The rail 18 is secured to a plate 28 which in turn is secured to the adjacent side of the opening in the tail board 26 and the rail 20 is secured to a channel shaped support member 30 which in turn is secured to the opposite side wall of the tail board opening 24, a small space being provided in the channel member 30 rearwardly of the rail 20. A pair of spaced beam members 32, 34 are pivotably mounted on the upper surface of the bed 12 by means of mounting plates 36, 38 secured to the bed to which bifurcated arms 40, 42 at the front end of each beam 32, 34 are journalled by studs 44 extending through the arms 40, 42 and the plates 36, 38. Thus, the apparatus may be mounted on the rear of a vehicle merely by cutting openings in the bed and in the tail board and welding or otherwise securing the apparatus to the adjacent structure of the vehicle and securing the mounting plates 36, 38 to the upper surface of the bed 12.

Figure 8:
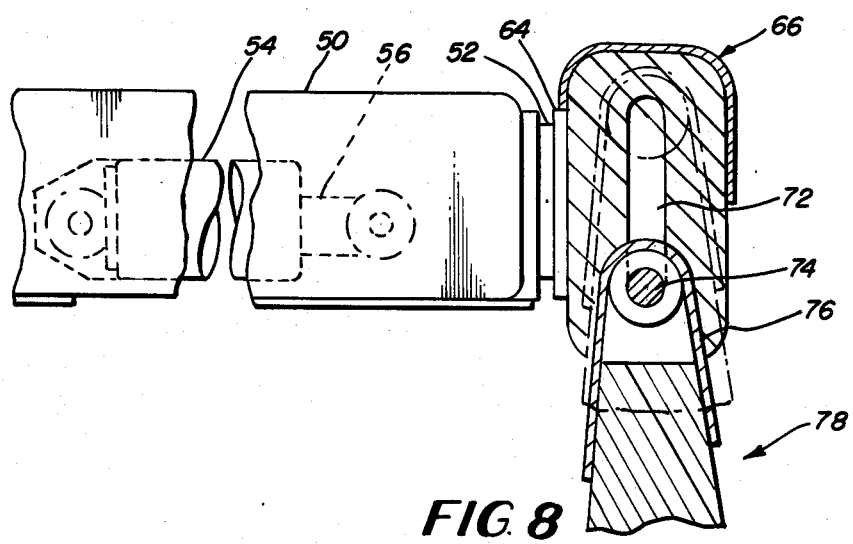
FIG. 8 is a fragmentary cross sectional view taken substantially along line 8—8 of FIG. 2 through a portion of the elevator and the connecting head of the lifting beam and illustrating the attitude changing means.

Spanning the beams 32, 34 at the rear ends thereof is a cross beam 46 having an opening 48 through the central portion. A hollow beam 50 of substantially the same shape as the opening 48 is disposed in the opening and secured to the walls thereof at one end, and is secured to and supported by a brace member 51 adjacent its other end, the brace member 51 extending across the bed and carried by brackets 53, 55 secured to the respective beams 32, 34. Telescopically carried within the hollow of the beam 50 is a lifting beam 52 which is shorter than the beam 50 and also is hollow. Carried within the hollow body of the lifting beam, as illustrated in FIG. 8, is a hydraulic attitude control cylinder 54. Extending from one end of the cylinder 54 is a piston rod 56 which is pivotably connected to the lifting beam 52, while the other end of the cylinder is pivotably connected to the beam 50, so that upon extension of the rod 56 the lifting beam 52 may be extended and upon retraction of the rod 56 the beam 52 acts likewise. A pair of hydraulic piston-cylinders 58, 60 are pivotably carried in the bucket 16 and are pivotably secured to the foward facing surface of the cross beam 46 on lugs 62 at opposite sides of the beam 50 for raising and lowering the beam members 32, 34 relative to the bed 12 about the stud shafts 44 which thereby raises and lowers the beam 50 and the lifting beam 52. Preferably the piston-cylinders are of the double telescoping type so that a large degree of raising of the beams 50, 52 above the bed 12 is available. The rearwardly extending end of the lifting beam 52 is welded to a face plate 64 of a connecting head 66 which comprises a pair of spaced side plates 68, 70 to which the face plate 64 is welded, the plates 68, 70 forming bifurcated elevator carrying members as hereinafter described.

Figure 2:
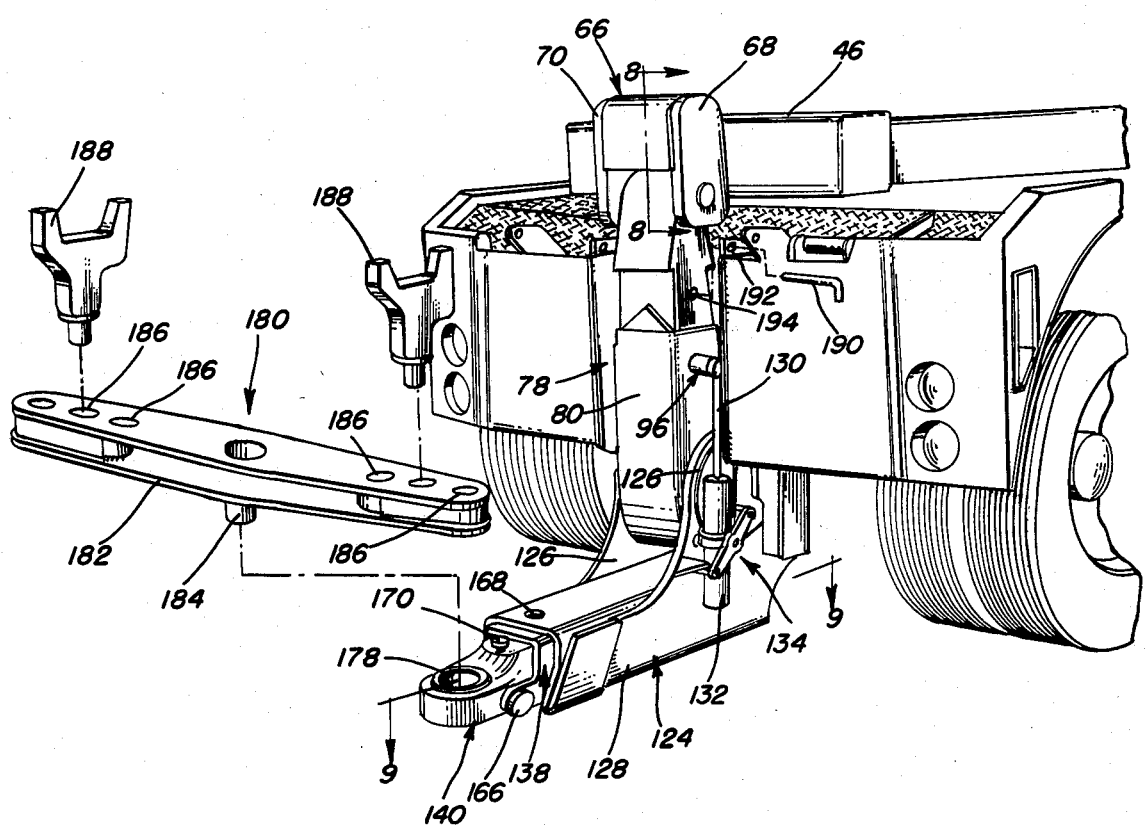
FIG. 2 is a rear perspective view of the vehicle and apparatus of FIG. 1 on a larger scale with the boom and elevator in the operative position being readied for lifting, and depicting the disabled vehicle supporting members in disassembled exploded form.
Figure 7:
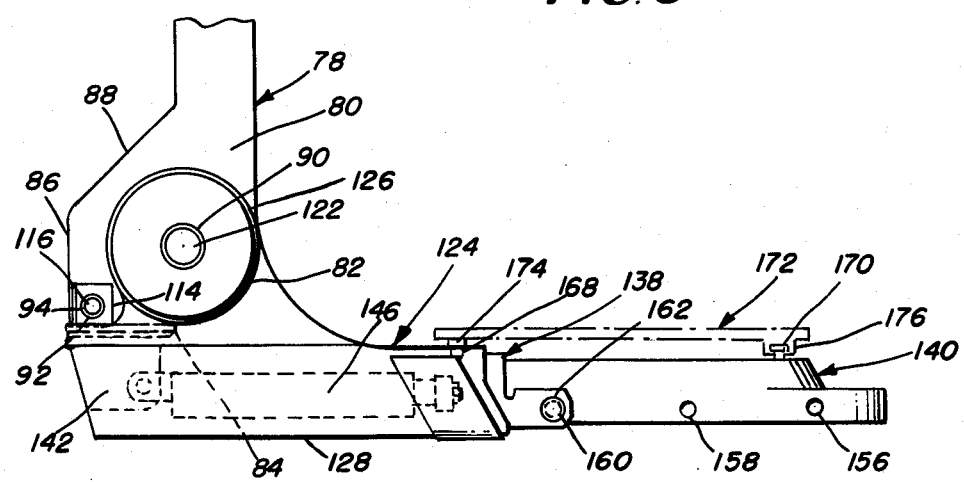
FIG. 7 is a fragmentary elevational view illustrating a portion of the elevator and showing the boom partially extended.

The plate 68, 70 on inner facing surfaces thereof each include a respective elongated groove 72, as illustrated in FIG. 8, the elongated axes of the grooves being in a plane substantially normal to the elongated axis of the beam 52. Slidably disposed in and spanning the grooves 72 is an axle 74 which extends through and carries the upper end portion 76 of the elevator generally designated at 78. The upper end portion 76 of the elevator 78 is configured such that it may be received within the connecting head 66, and to this end may have a tappered configuration as illustrated in the drawings. Thus, although the axle 74 normally is disposed in the bottom of the groove 72 as illustrated in FIG. 8, in the storage position as hereinafter described, the head 66 may be moved downwardly relative to the elevator and the axle 74 is then disposed at the top of the grooves. The elevator 78 comprises an assembly including, as best illustrated in FIG. 7, a body member 80 secured to the upper end portion 76 by welding or the like, and has a convex arcuate rearwardly facing edge 82, a substantially linear bottom edge 84, a substantially linear upstanding edge 86 extending partly upwardly of the body and facing toward the front of the vehicle 10 and the bucket 16, and an edge 88 extending from the edge 86 and to the upper part of the body member just below where it is secured to the upper end portion 76. Intermediate the edges 82 and 86 the body of the elevator includes a circular bore 90, while appropriately spaced from the bore 90 there is another circular bore 92 having a hub 94 extending from the outer faces of the body member 80 about the bore 92. Another hub 96 is disposed on and extends from the body member on one side thereof spaced above the bore 90, as illustrated in FIG. 2.

As best illustrated in FIG. 6 each respective rail 20 comprises a vertical slide having a slideway formed by and between a dovetail piece 98 and an end portion 100 each extending toward the other rail. A slide track 102 is disposed in abutting relationship against each rail, the tracks 102 having portions 104 with dovetail shapes 106 for cooperating with the piece 98 on one edge and closely fit against the remainder of the piece 98. The tracks 102 also abut the respective end portions 100 and are locked into slidable disposition with the rails 20 by means of plates 108 spaced from the portions 100 by means of spacers 110 which are secured to the end portions 100 and to the plates 108. Each of the tracks 102 are formed with a rectangular shaped channel 112 for receiving a slide block 114. Disposed through the body member 80 through the bores 92 is an axle 116 which has journalled ends 118 thereon, and each slide block 114 includes a bore for journally receiving the respective end 118. Thus, the elevator may slidably move with the blocks 114 as the blocks move in the slideway formed by the channel 112 and may also pivot relative to the blocks with or about the axle 116. Moreover, a stop plate 120 is mounted to the top of each slide track 102 so that when the blocks 114 move into abutting engagement with the plates 120, upon further lifting of the elevator, the slide tracks are forced upwardly and slide within the rails 20 to provide additional elevational movement for the elevator relative to the roadway.

Disposed in the bore 90 is an axle 122 which journally carries the lifting boom first stage assembly 124. The assembly 124 has a first or mounting portion 126 which comprises a pair of arcuate shaped elongated arms spaced apart for straddling the elevator body and for receiving the axle 122, and a second or carrying portion 128. The carrying portion 128 comprises a substantially rectangular hollow channel elongated in a direction substantially normal to the direction of elongation of the portion 126. Securely fastened on the hub 96 of the elevator is the end of the piston rod 130 of a hydraulic cylinder 132, the cylinder 132 being mounted on the mounting portion 126 of the first stage boom assembly by means of a trunion mount 134 comprising a lever 136 (FIG. 4) pivotably mounted centrally thereof on the body of the cylinder 132 and pivotably mounted at each end to the first stage boom assembly 124. Extension of the piston rod 130 by hydraulic fluid effects a pivotable turning of the boom 124 relative to the elevator body member 80 such that the axis of the boom is disposed substantially normal to the axis of the elevator as illustrated in FIG. 2, and when the piston rod is retracted by means of the action of the hydraulic fluid the boom assembly 124 pivotably rotates to the position where the axis of the boom is substantially parallel to the axis of the elevator body 80 and in substantially abutting relationship as illustrated, as example, in FIGS. 1 and 4. Thus, the function of the hydraulic cylinder 132 is to pivot the boom from the stow position of FIG. 1 to the operative positions and the rod 130 is either fully extended or retracted.

Mounted within the hollow of the first stage lifting boom assembly 124 in telescopic relationship is a hollow second stage boom assembly 138 which in turn telescopically receives a third stage boom assembly 140. On the inside of the inner end of the first stage boom assembly 124 depending from an upper wall thereof is an appendage 142 having an aperture for receiving a pin 144. Pivotably mounted on the pin 144 is the end of a hydraulic cylinder 146 having the outer end of its piston rod 148 connected to the cap 150 of a cage-like structure comprising a plurality of rods 152 welded to the cap 150 at the front and extending toward the inner end of the booms, the corresponding ends of the rods being fastened to a lip 154 at the inner end of the second stage boom assembly 138. Thus, when the piston rod 148 is extended, the second stage moves outwardly together with the cage-like structure. The third stage boom assembly 140 includes a plurality of aligned bores 156, 158, 160 extending therethrough for receiving a locking rod 162, one end 164, for example, of which is larger than the bores and the other end of which has a cap 166 threaded onto or otherwise removably secured to the rod. The rod 162 may be inserted through any of the bores 156, 158, 160 selectively to couple the second and third stages together so that as the second stage is extended so to is the third stage.

The boom structure provides the capability of twice extending the third stage, i.e., obtaining a first extension by actuating the piston 148 while the rod 162 is disposed in the bore 156, and thereafter removing the rod from the bore 156, locking the third stage to the first stage, retracting the piston 148, inserting the rod 162 within the bore 160, unlocking the third stage from the first stage, and again extending the piston to extend the second and third stages. To this end the first stage 124 may include a hole 168 while the third stage 140 includes a nub 170 aligned with the hole 168 on respective surfaces preferably the top surfaces thereof. An elongated locking tool 172 has a boss 174 adjacent one end adapted to be received within the hole 168 and a recessed boss 176 adapted to receive the nub 170 adjacent the other end, the spacing between the boss 174 and the axis of the boss 176 being substantially equal to the distance the third stage is extended from the first stage upon the first actuation of the piston 148. Thus, after the third stage is extended, the tool 172 may lock the first and third stages together so that the second stage is free to be retracted by the piston 148 when the pin 162 is removed from the bore 156. Then, after the pin 162 is inserted into the bore 160, the tool 168 may be removed and the piston 148 again extended. Upon the second extension of the piston 148 the second and third stages are also extended thereby to provide a double extension of the third stage.

At the free end of the third stage boom assembly 140 is a vertically extending bore 178 adapted to receive a conventional disabled vehicle lifting assembly 180. The assembly 180 includes a cross member 182 adapted to span the undercarriage of a disabled vehicle and includes a boss 184 affixed thereto adapted to be received within the bore 178. The member 182 also includes a plurality of bores 186 on each end for selectively receiving a respective yoke 188 which in turn is adapted to receive the axle or other member of the undercarriage of the disabled vehicle in the crotch of the yoke.

For safety purposes, in the stow position the elevator assembly 78 may be securely locked by means of a safety device such as a latch pin 190 which is inserted through a hole in a latch block 192 secured to the vehicle or the member 30 and passing through a hole 194 in the elevator 78 adjacent the upper portion 76, the pin 190 thereafter entering a hole in another latch block 192 secured to the vehicle or the member 28 on the opposite side of the elevator. Thus, the pin 190 will maintain the elevator and boom assemblies in a raised position above the road despite a possible failure in the hydraulic system.

In the use of the apparatus 14, assuming the apparatus is in the stow position, the assemblies are generally disposed substantially as illustrated in FIG. 1 with the second and third stage boom assemblies 138 and 140 retracted into the first stage boom assembly 124, the first stage boom assembly being pivoted into substantial abutting parallel relationship with the elevator body 80 by retraction of the piston rod 130, and with the elevator assembly in a slightly raised position such that the latch pin 190 may be disposed through the hole in the body 80. In this position the elevator and boom assemblies are located such that ample clearance is provided between the road bed and the apparatus. In the stow position the cylinders 58, 60 are retracted so that the beam members 32, 34 and the cross beam 46 lie substantially on the deck of the bed 12. In this position the connecting head 66 is lowered so that the axle 74 is disposed at the top of the grooves 72 and the entire unit is compactly disposed on the towing vehicle. The position illustrated in FIG. 1 depicts the apparatus when the connecting head 66 is raised slightly and the axle 74 is located in the bottom of the grooves 72, such as the solid position illustrated in FIG. 8, this being the positions just slightly before or after stow when the cylinders 58 and 60 are slightly extended for insertion or retraction of the latch pin 190 into the hole 194. Thus, in the stow position, because of the construction and disposition of the beam members 32, 34 and the lifting beam 52, sufficient space is available between the members 32, 34 toward the front of the lifting vehicle for mounting of wrecker recovering apparatus for winching of disabled vehicles from ditches or the like.

When a towing operation is to commence the connecting head 66 is first raised slightly by means of the cylinders 58, 60 so that the safety latch pin 190 may be removed from the hole 194, as aforesaid, and the axle 72 then supports the elevator and boom assemblies. The first stage boom assembly 124 (together with the second and third stage boom assemblies) is then pivoted about the axle 122 relative to the elevator assembly 78 by means of the hydraulic piston/cylinder 130, 132 until the boom is substantially perpendicular to the elevator, the piston 130 being fully extended. The cylinders 58, 60 may then be lowered, if not previously lowered when the elevator was unlocked, and the boom assemblies lowered to the road as the elevator moves vertically as constrained by the slide blocks 114 within the slideways 112. Depending on the angular disposition of the roadway, the attitude control cylinder 54 generally will also be extended to extend the lifting beam 52 selectively to maintain the first stage boom 124 parallel to the roadway. As the beam 52 is manipulated the elevator assembly pivots about the axle 116 relative to the blocks 114.

The towing vehicle is backed up to the disabled vehicle and the second and third stage boom assemblies are extended as necessary, as heretofore described. The disabled vehicle lifting assembly 180 is positioned in the third stage boom assembly 140 and is appropriately disposed beneath the undercarriage of the disabled vehicle and the cylinders 58, 60 are extended slightly so the yokes 188 engage the disabled vehicle properly. The second and third stage booms may then be retracted by reversing the above described proceedure until the disabled vehicle is sufficiently close to the tail board 26 of the towing vehicle 10 without chance of contacting the same. The disabled vehicle may then be lifted the desired amount above the roadway by actuation of the cylinders 58, 60 while the angular disposition of the boom assemblies and thus the disabled vehicle is controlled by varying the extension of the lifting boom 52 by the attitude control cylinder 54. The disabled vehicle may then be towed as desired.

To stow the apparatus the reverse proceedure is followed, and after the apparatus is in the position illustrated in FIG. 1, the latch pin 190 is inserted into the hole 194 to lock the elevator and boom assemblies. The beam members 32, 34 may then be lowered to the deck of the bed 12 and the connecting head is then disposed with the axle 74 at the top of the grooves 72.

Figures 10, 11:
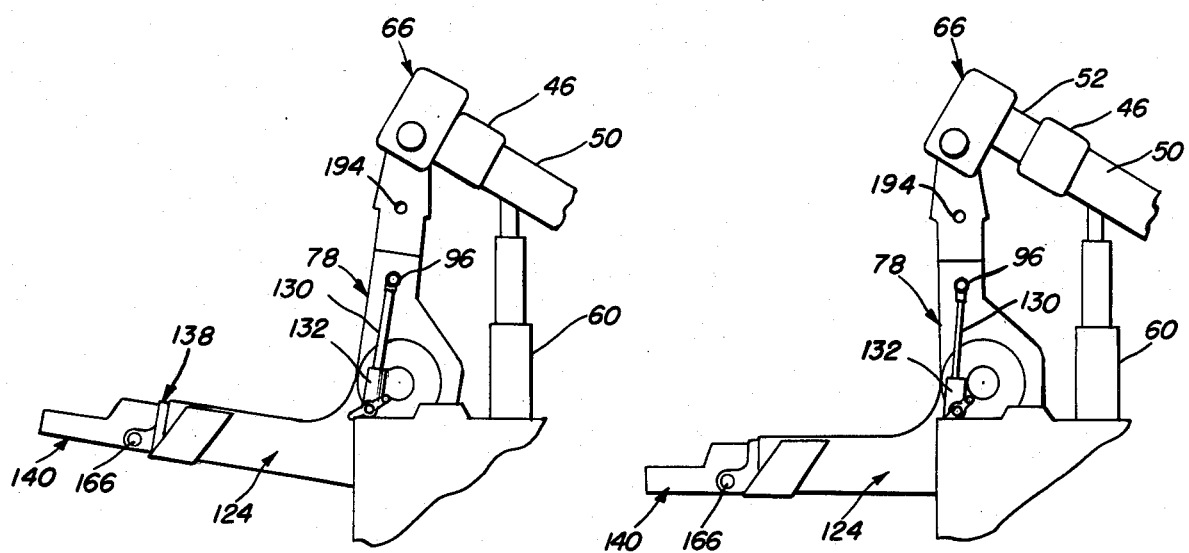
FIGS. 10 through 12 depict in diagrammatic form various articulated positions of the apparatus.
Figure 12:
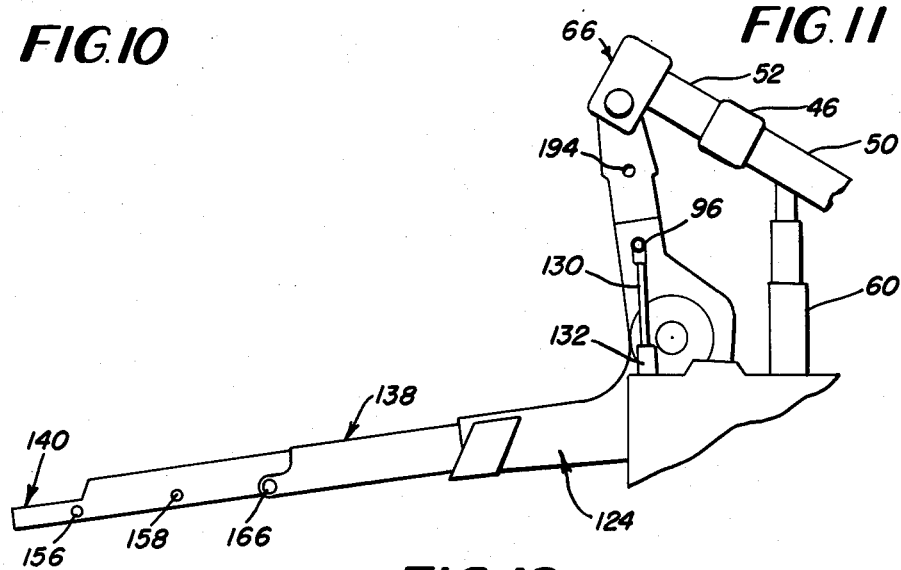

FIGS. 10 through 12 illustrate diagrammatically various manipulated operative positions of the apparatus with the piston 130 extended to depict the articulations that may occur with the apparatus. In FIG. 10 the lifting boom 52 is fully retracted, the cylinders 58, 60 extended and the second and third stage boom assemblies retracted. The boom assemblies 124, 138, 140 are thus inclined upwardly in this position. In FIG. 11 the attitude cylinder 54 has been actuated to extend the lifting beam 52 to change the inclination of the boom assemblies substantially to the horizontal inclination. In FIG. 12 the lifting beam 52 is further extended to incline the boom assemblies to a downward inclination and the second and third stage boom assemblies 138, 140 have been fully extended. The versatility of the apparatus will thus be readily seen by one skilled in the art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus adapted to be mounted on the rear of a towing vehicle for lifting and towing a disabled vehicle, said apparatus comprising support means adapted to be secured to the towing vehicle, said support means including a pair of spaced rails having respective substantially vertically extending slideways, an elevator, a slide block slidably disposed within each slideway, means for fastening said slide blocks to said elevator so that said elevator may move vertically relative to said slideway to various elevational positions, a lifting boom having a free end adapted for attaching disabled vehicle engaging means, journal means for mounting said lifting boom on said elevator for pivotable movement about a substantially horizontal axis from an upright storage position to a rearwardly extending operative position, extendible beam means adapted to be pivotably mounted on said towing vehicle about a substantially horizontal pivot axis, elevation control means for selectively raising and lowering said extendible beam means relative to said towing vehicle, attitude control means for selectively extending and retracting said extendible beam means relative to said pivot axis, connecting means for pivotably mounting said elevator on said extendible beam means for raising and lowering said elevator in response to said elevational control means and for pivoting said elevator in response to said attitude control means independently of the elevational position of the elevator, and means for selectively pivoting said lifting boom relative to said elevator between said storage position and said operative position.

2. Apparatus as recited in claim 1, wherein said means for fastening said slide blocks to said elevator comprises axle means having an axis confined within the respective slideways for journally mounting said elevator for pivotable movement about said axis relative to said slideways.

3. Apparatus as recited in claim 2, wherein said extendible means comprises first beam means adapted for pivotable mounting on said towing vehicle, and second beam means telescopically carried by said first beam means, said connecting means being carried by said second beam means, said means for selectively raising and lowering said extendible beam means comprising power lift means vertically extendible relative to said towing vehicle, and said attitude control means comprising power means for moving said second beam means relative to said first beam means.

4. Apparatus as recited in claim 3, wherein said connecting means comprises a hollow head member fastened to said second beam means, an axle journally carried by said elevator and positioned within said head, said head having spaced elongated grooves for receiving and carrying opposite ends of said axle and for permitting substantially vertical movement of said head relative to said axle and said elevator, said elevator in the vicinity of said axle being configured for entry into said head when the apparatus is in the storage position.

5. Apparatus as recited in claim 1, wherein said means for selectively pivoting said lifting boom relative to said elevator comprises power extension means connected to said boom and to said elevator for pivoting said boom into the operative position when extended and for pivoting the boom into the storage position when retracted.

6. Apparatus as recited in claim 5, wherein said means for fastening said slide blocks to said elevator comprises axle means having an axis confined within the respective slideways for journally mounting said elevator for pivotable movement about said axis relative to said slideways.

7. Apparatus as recited in claim 4, wherein said means for selectively pivoting said lifting boom relative to said elevator comprises power extension means connected to said boom and to said elevator for pivoting said boom into the operative position when extended and for pivoting the boom into the storage position when retracted.

8. Apparatus as recited in claim 1, wherein said lifting boom comprises a first stage boom assembly pivotably mounted on said elevator, said first stage assembly having a hollow body, at least a second stage boom assembly telescopically receivable within said first stage, and power means acting between said first stage and said second stage for extending said second stage selectively relative to said first stage, wherein said second stage boom assembly comprises a hollow body, a third stage boom assembly telescopically receivable within said second stage, means for coupling said second and third stages together selectively at selective dispositions of said third stage within said second stage, and coupling tool means for selectively coupling said third stage to said first stage for permitting changing of the relative disposition of the second and third stages.

9. Apparatus as recited in claim 2, wherein each of said slideways is slidably disposed within a respective rail, each slideway having an abutment member disposed on and closing the top thereof, whereby upon upward vertical movement of said elevator said slide blocks may engage said abutment members and upon further upward movement of said elevator said slideways move together with said elevator relative to said rails.

10. Apparatus as recited in claim 3, wherein said first beam means comprises a pair of spaced beam members pivotable at respective first ends, a cross beam connecting said beam members together at their respective upper ends, a hollow beam carried by said cross beam, and said second beam means being receivable within and moveable relative to said hollow beam.

11. Apparatus as recited in claim 10, wherein said connecting means comprises a hollow head member fastened to said second beam means, an axle journally carried by said elevator and positioned within said head, said head having spaced elongated grooves for receiving and carrying opposite ends of said axle and for permitting substantially vertical movement of said head relative to said axle and said elevator, said elevator in the vicinity of said axle being configured for entry into said head when the apparatus is in the storage position.

12. Apparatus as recited in claim 2, wherein said means for selectively pivoting said lifting boom relative to said elevator comprises power extension means connected to said boom and to said elevator for pivoting said boom into the operative position when extended and for pivoting the boom into the storage position when retracted.

13. Apparatus as recited in claim 8, wherein said means for fastening said slide blocks to said elevator comprises axle means for journally mounting said elevator for pivotable movement relative to said slideways.

14. Apparatus as recited in claim 13, wherein said extendible beam means comprises first beam means adapted for pivotable mounting on said towing vehicle, and second beam means telescopically carried by said first beam means, said connecting means being carried by said second beam means, said means for selectively raising and lowering said extendible beam means comprising power lift means vertically extendible relative to said towing vehicle, and attitude control means for moving said second beam means relative to said first beam means.

15. Apparatus as recited in claim 14, wherein said connecting means comprises a hollow head member fastened to said second beam means, an axle journally carried by said elevator and positioned within said head, said head having spaced elongated grooves for receiving and carrying opposite ends of said axle and for permitting substantially vertical movement of said head relative to said axle and said elevator, said elevator in the vicinity of said axle being configured for entry into said head when the apparatus is in the storage position.

16. Apparatus as recited in claim 15, wherein said attitude control means includes extendible power means for selectively moving said second beam means relative to said first beam means.

17. Apparatus as recited in claim 1, wherein said connecting means comprises a hollow head member fastened to said extendible beam means, an axle journally carried by said elevator and positioned within said head, said head having spaced elongated grooves for receiving and carrying opposite ends of said axle and for permitting substantially vertical movement of said head relative to said axle and said elevator, said elevator in the vicinity of said axle being configured for entry into said head when the apparatus is in the storage position.

18. Apparatus adapted to be mounted on the rear of a towing vehicle for lifting and towing a disabled vehicle, said apparatus comprising support means adapted to be secured to the towing vehicle, said support means including a pair of spaced rails having respective substantially vertically extending slideways, an elevator, a slide block disposed within each slideway, means for fastening said slide blocks to said elevator so that said elevator may move vertically relative to said slideways to various elevational positions and for journally mounting said elevator for pivotable movement relative to said slideways, a lifting boom having a free end adapted for attaching disabled vehicle engaging means, journal means for mounting said lifting boom on said elevator for pivotable movement about a substantially horizontal axis from an upright storage position to a rearwardly extending operative position, extendible beam means including first beam means adapted to be pivotably mounted on said towing vehicle about a substantially horizontal axis, second beam means telescopically carried by said first beam means, power lift means for selectively raising and lowering said extendible beam means relative to said towing vehicle, connecting means carried by said second beam means for pivotably attaching said extendible beam means to said elevator for moving said elevator and said boom upon movement of said extendible beam means, attitude control means for selectively extending and retracting said second beam means relative to said first beam means to pivotably move said elevator relative to said slideways independently of the elevational position of the elevator, and means for selectively pivoting said lifting boom relative to said elevator between said storage position and said operative position.

19. Apparatus as recited in claim 18, wherein said connecting means comprises a hollow head member fastened to said second beam means, an axle journally carried by said elevator and positioned within said head, said head having spaced elongated grooves for receiving and carrying opposite ends of said axle and for permitting substantially vertical movement of said head relative to said axle and said elevator, said elevator in the vicinity of said axle being configured for entry into said head when the apparatus is in the storage position.

* * * * *